United States Patent [19]

Ballard

[11] Patent Number: 4,502,875
[45] Date of Patent: Mar. 5, 1985

[54] AIR INTAKES OF AIRCRAFT MOUNTED GAS TURBINE ENGINES

[75] Inventor: John R. Ballard, Sarrett, England
[73] Assignee: Rolls-Royce Limited, London, England
[21] Appl. No.: 552,422
[22] Filed: Nov. 16, 1983
[30] Foreign Application Priority Data Dec. 23, 1982 [GB] United Kingdom ............... 8236595

[51] Int. Cl.³ .................. B64C 23/00; B01D 45/16
[52] U.S. Cl. ........................................ 55/306; 55/313; 55/419; 244/53 B; 60/39.092; 137/15.1
[58] Field of Search ............... 55/306, 307, 313, 314, 55/347, 348, 419, 420, 484; 137/15.1; 244/53 B; 60/39.092; 415/121 G

[56] References Cited

U.S. PATENT DOCUMENTS

| | | |
|---|---|---|
| 2,699,906 | 1/1955 | Lee et al. ............................ 244/53 B |
| 3,222,863 | 12/1965 | Klees et al. ....................... 244/53 B |
| 3,483,676 | 1/1969 | Sargisson ............................. 55/306 |
| 4,291,530 | 9/1981 | Ballard ................................ 55/306 |
| 4,346,860 | 8/1982 | Tedstone .......................... 60/39.092 |

Primary Examiner—David L. Lacey
Attorney, Agent, or Firm—Cushman, Darby & Cushman

[57] ABSTRACT

An air intake for a helicopter mounted gas turbine engine comprises two intake portions which comprises vortex separator panels. One panel is generally forward facing while the other is generally sideways facing. A panel is pivotally mounted between the separator panels so as to pivot between a first position in which it obturates the generally sideways facing panel and a second position in which it obturates neither of the separator panels. The arrangement is such that when the helicopter is in fast forward flight, the pressure of the ram air flow through the generally forward facing inlet panel causes the pivoted panel to pivot to the position in which it obturates the generally sideways facing inlet panel.

2 Claims, 1 Drawing Figure

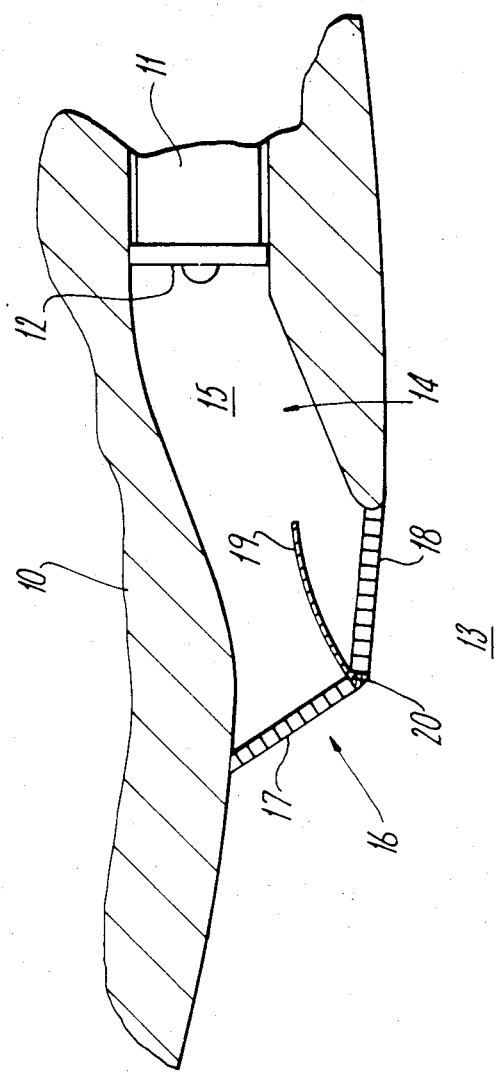

AIR INTAKES OF AIRCRAFT MOUNTED GAS TURBINE ENGINES

This invention relates to the air intakes of aircraft mounted gas turbine engines and has particular reference to the air intakes of helicopter mounted gas turbine engines.

When helicopters are called upon to hover or fly slowly at low altitude there is a danger that dust, sand or other foreign material such as water droplets will be drawn into the engine or engines which power the helicopter. If this occurs, extensive damage can be caused to the engine or engines. It is common practice therefore to provide helicopter mounted gas turbine engines with some form of debris separator upstream of their air inlets in order to ensure that as much debris as possible is separated from the air before it enters the engine. Debris separators may take the form of vortex separator panels or alternatively may be in the form of wire mesh panels. Vortex separator panels are well known in the prior art and usually comprise a panel containing a plurality of vortex separators. Each vortex separator in turn comprises a device which is so shaped as to induce air passing through it into a vortex. This centrifuges particulate debris and water droplets carried by the air into a suitably shaped collector where it is stored for later removal or is dumped overboard.

It is desirable to have a debris separator which has a large cross-sectional area in order to provide effective separation on the one hand and permit an adequate air supply to the engine on the other. Large cross-sectional area debris separators cause a high level of drag if they are forward facing and consequently it is usual to site them in a sideways facing position. While this is effective when the helicopter is hovering or flying slowly, it is not so effective at higher forward speeds because of the lack of ram air it provides for the engine. If a portion of the separator is positioned so as to be forward facing to ensure a supply of ram air for the engine in forward flight, there is a danger that some of that ram air will be lost through the remaining side facing portion of the separator. This results in an insufficient supply of air for the engine and consequently has a detrimental effect upon its efficiency and performance.

It is an object of the present invention to provide an aircraft mounted gas turbine engine air intake system having a debris separator which provides an adequate air flow to the gas turbine engine when the aircraft upon which the intake is mounted is in both hover and forward flight conditions.

According to the present invention, an air intake system for an aircraft mounted gas turbine engine comprises a duct which interconnects the air inlet of a gas turbine engine with the exterior of the aircraft which carries the engine, said duct being provided with two air inlet portions, the first of which is generally forward facing and the second of which is generally sideways facing, both with respect to the aircraft which carries said engine, each of said air inlet portions including a debris separator of the type which prevents the passage of debris but permits the passage of air therethrough, said intake being provided with obturating means which is movable from a first position in which it prevents the flow of air through the generally sideways facing inlet portion when said generally forward facing inlet portion is subject to ram air flow therethrough to a second position in which it does not obturate either of said generally forward and sideways facing inlet portions when said generally forward facing inlet portion is not subject to ram air flow therethrough.

The invention will now be described, by way of example, with reference to the accompanying drawing which shows a sectional plan view of a portion of a helicopter provided with an air intake system in accordance with the present invention.

With reference to the drawing, a portion of a helicopter 10 contains a gas turbine engine 11 which is one of two similar engines constituting the helicopter power units. The gas turbine engine 11 has an air inlet 12 which is in communication with the exterior 13 of the helicopter 10 by way of an air intake system 14. The air intake system 14 comprises a duct 15 having an air inlet 16, and terminates at the engine air inlet 12.

The duct air inlet 16 is covered by two abutting vortex debris separator panels 17 and 18. The vortex debris separator panels are in side-by-side arrangement and angularly disposed with respect to each other so that one panel 17 is forwardly facing as it extends across a generally forward facing intake portion and the other panel 18 is sideways facing as it extends across a generally sideways facing intake portion (the front of the helicopter 10 being on the left hand side of the drawing). The vortex debris separator panels 17 and 18 are of conventional construction and comprise a plurality of vortex separators, each of which induces air passing through it into a vortex so as to separate debris and water droplets from the air and direct the separated water and debris into a suitable container or dump it overboard. After debris separation, the air passes into the duct 15 and thence into the engine air inlet 12. It will be appreciated however that the panels 17 and 18 need not necessarily be in the form of vortex separators and that other forms of debris separator, such as wire mesh panels, could be utilised.

A panel 19 is pivotally attached to the separator panels 17 and 18 at their line of intersection 20. The panel 19 is free to pivot so that its pivotal position is governed by the air flows through the separator panels 17 and 18 which act upon it. Thus when the helicopter 10 is hovering or in slow forward flight, the gas turbine engine 11 draws in air through both of the separator panels 17 and 18. This results in air flows of generally similar pressure acting upon each face of the panel 19, thereby causing it to assume an equilibrium position as shown in the drawing in which it has minimal effect upon the air flows through the separator panels 17 and 18. However when the helicopter 10 is in fast forward flight, the generally forward facing separator panel 17 is subject to a flow of ram air through it. Consequently under these conditions, the pressure of the flow of air through the generally forward facing separator panel 17 is greater than that drawn in through the generally sideways facing panel 18. This being so, the flow of ram air through the generally forward panel 17 acts upon the pivoted panel 19 to cause it to pivot to a position in which it obturates the generally sideways facing separator panel 18. Thus in fast forward flight the air supply for the engine 11 is entirely ram air which is derived from the generally forward facing separator panel 17. As soon as the forward speed of the helicopter 10 reduces, the ram air flow through the generally forward facing separator panel 17 decreases, and so therefore does its pressure, thereby causing the pivoted panel 19 to return to the position shown in the drawing to permit the resumption of an air flow through the generally sideways facing panel 18.

The pivoted panel 19, which is slightly curved as shown in the drawing in order to optimize its aerodynamic effectiveness, thereby ensures that when the generally forward facing separator panel 17 is subject to a ram air flow through it, the generally sideways facing panel 18 is obturated by the pivoted panel 19. Consequently the pivoted panel 19 ensures that there is no leakage ram air from the duct 15 back to the exterior 13 of the helicopter 10 by means of reverse air flow through the generally sideways facing separator panel 18. Such a leakage of air would reduce the amount and pressure of air available to the engine 11, thereby adversely affecting its performance.

It may be desirable in certain instances to provide the pivoted panel 19 with some form of damping of its pivoting action.

The present invention therefore provides an air intake for a gas turbine engine mounted on an aircraft which ensures that an adequate supply of air for the engine is provided both when the aircraft is hovering or in slow forward flight and when it is in fast forward flight.

Although the present invention has been described with reference to an air intake for a gas turbine engine mounted in a helicopter, it is also applicable to other types of aircraft which are capable of both hovering and fast forward flight.

It will also be appreciated that although the present invention has been described with reference to generally forward and side facing separator panels 17 and 18 which are adjacent each other, they could in fact be spaced apart so that two separate duct air inlet portions are defined.

I claim:

1. In combination with an aircraft having at least one gas turbine engine and capable of hover and forward flight conditions, the improvement in an air intake system for the gas turbine engine comprising:

a duct interconnecting an air inlet of said gas turbine engine with an exterior of said aircraft, said duct having a single first forwardly facing air inlet portion for receiving ram air therethrough during forward flight condition as well as air therethrough during hover flight condition and a single second immediately adjacent sideways facing air inlet portion for receiving air therethrough only during hover flight condition, said second air inlet portion being angularly disposed relative to said first air inlet portion;

a vortex separator panel extending across said first air inlet portion for separating debris from air passing therethrough;

a second vortex separator panel extending across said second air inlet portion for separating debris from air passing therethrough, said second vortex separator panel abutting and being angularly disposed with respect to said first vortex separator panel;

and an obturating panel having an upstream end freely pivotally connected between said forwardly facing first air inlet portion and said second immediately adjacent sideways facing air inlet portion, said obturating panel being on a downstream side of both said first vortex separator panel and said second vortex separator panel, said obturating panel being positioned and arranged to be moved to a first position in which it prevents flow of air through said second vortex separator panel of said second air inlet portion when said aircraft is in forward flight condition and said first air inlet portion is subjected to ram air flow therethrough and to a second position wherein said obturating panel permits flow of air through both said first vortex separator panel and said second vortex separator panel of said first air inlet portion and said second air inlet portion respectively when said aircraft is in hover flight condition.

2. The combination as claimed in claim 1 in which said obturating panel is curved in cross-section to define a convex side and a concave side, said convex side facing said first vortex separator panel and said concave side facing said second vortex separator panel.

* * * * *